United States Patent [19]

Kaji et al.

[11] Patent Number: 4,916,614

[45] Date of Patent: Apr. 10, 1990

[54] SENTENCE TRANSLATOR USING A THESAURUS AND A CONCEPT-ORGANIZED CO-OCCURRENCE DICTIONARY TO SELECT FROM A PLURALITY OF EQUIVALENT TARGET WORDS

[75] Inventors: Hiroyuki Kaji, Tama; Fumon Shimizu, Yokohama, both of Japan

[73] Assignee: Hitachi, Ltd., Tokyo, Japan

[21] Appl. No.: 123,791

[22] Filed: Nov. 23, 1987

[30] Foreign Application Priority Data

Nov. 25, 1986 [JP] Japan .................................. 61-280033
Aug. 7, 1987 [JP] Japan .................................. 62-197423

[51] Int. Cl.⁴ .............................................. G06F 15/38
[52] U.S. Cl. .................................... 364/419; 364/900; 364/920.4
[58] Field of Search ........................ 364/419, 200, 900

[56] References Cited

U.S. PATENT DOCUMENTS 4,635,199  1/1987  Muraki ................................ 364/419
4,703,425  10/1987  Muraki ................................ 364/419

FOREIGN PATENT DOCUMENTS 0144868  7/1985  Japan .
0144869  7/1985  Japan .
0200368  10/1985  Japan .

*Primary Examiner*—Clark A. Jablon
*Attorney, Agent, or Firm*—Fay, Sharpe, Beall, Fagan, Minnich & McKee

[57] ABSTRACT

In a system of performing automatic translation from natural language into another natural language based on dependence relation among concepts, a thesaurus representing implication among concepts and a co-occurrence dictionary storing co-occurrence relation between a predicate word and an argument concept are utilized to select a suitable translation word when a plurality of candidate words exist corresponding to a predicate concept. Furthermore, knowledge regarding the co-occurrence relation is obtained based on feedback information from a revise operation to translation results, thereby contents of co-occurrence relation dictionary can be more and more complete.

7 Claims, 6 Drawing Sheets

| 41<br>WORD | 42<br>PART OF SPEECH | 43<br>CASE FRAME | 44<br>CONCEPT SYMBOL |
|---|---|---|---|
| 割当てる | V | AGENT : が (GA)<br>OBJECT : を (O)<br>RECIPIENT : に (NI) | WARIATERU |
| 入出力装置 | N | ——— | I/O SOUTI |
| 仕事 | N | ——— | SHIGOTO |
| ファイル | N | ——— | FILE |
| 資源 | N | ——— | SHIGEN |

FIG. 3

| 51 CONCEPT SYMBOL | 52 WORD | 53 PART OF SPEECH | 54 CASE FRAME |
|---|---|---|---|
| WARIATERU | ALLOT | V | AGENT:S, OBJECT:DO, RECIPIENT:IO |
|  | ASSIGN | V | AGENT:S, OBJECT:DO, RECIPIENT:IO |
|  | ALLOCATE | V | AGENT:S, OBJECT:DO, RECIPIENT:IO |

| 51 | 52 | 53 | |
|---|---|---|---|
| I/O-SOUTI | I/O EQUIPMENT | N | — |
| SHIGEN | RESOURCE | N | — |
| SHIGOTO | TASK | N |  |
|  | WORK | N |  |
| FILE | FILE | N | — |

FIG. 4

| 61 WORD | 62 CONCEPT SYMBOL | 63 CASE |
|---|---|---|
| ALLOCATE | SHIGEN | OBJECT |

SENTENCE TRANSLATOR USING A THESAURUS AND A CONCEPT-ORGANIZED CO-OCCURRENCE DICTIONARY TO SELECT FROM A PLURALITY OF EQUIVALENT TARGET WORDS

BACKGROUND OF THE INVENTION (1) Field of the Invention

The present invention relates to a natural language generating system, and more specifically to a method and an apparatus for selecting a translation most suitable for a word in a sentence to be translated, when automatic translation is performed from a language to another language, for example, from Japanese to English.

(2) Description of the Prior Art

When a language to be translated (source language) is translated by an automatic translation apparatus (machine translation apparatus) into another language (target language), a sentence of the source language is analyzed and converted into intermediate representation suitable for translation, and the intermediate representation is utilized as input to target language generation.

The above-mentioned intermediate representation represents syntactic structure of a sentence or semantic structure thereof, and an element of the intermediate representation is usually a word of source language or a concept symbol.

In target language generation, a word of target language is assigned to each element of the intermediate representation, and a sentence is generated according to grammar of the target language. In this generation step, when a plurality of equivalent words of the target language exist corresponding to a single element of the intermediate representation, it becomes a problem which equivalent word should be selected as the translation word.

With respect to this problem, knowledge regarding co-occurrence of words may be utilized. The co-occurrence means that a word and another word occur having a specific semantic relation in a sentence, and the co-occurrence has restriction. Consequently, utilizing this restriction, a suitable word can be selected among a plurality of equivalent words.

Sentence generation based on this idea is disclosed, for example, in Japanese patent application laid-open No. 60-144869.

However, a method proposed in the reference has problems as follows:

(1) Since pairs of co-occurring words are massive, a memory of large storage capacity is required to realize word selection on the basis of co-occurrence, and it is difficult to collect all data regarding the co-occurrence entirely.

(2) Similar co-occurrence relations are frequently established in synonym, but co-occurrence data stored in the form of pairs of words cannot be utilized in the case of synonym.

SUMMARY OF THE INVENTION

Accordingly, a main object of the invention is to realize a method and an apparatus for generating or translating a natural language sentence, wherein when automatic translation is performed by utilizing co-occurrence data of words, the required co-occurrence data is reduced for more effective utilization.

In order to attain the foregoing object, an apparatus of the invention comprises:

a first memory to store a source language analysis dictionary constituted by records, each including a word of source language, the part of speech, the case frame, and the concept symbol of concept corresponding to the word;

a second memory to store a target language generation dictionary constituted by records, each including a concept symbol, one or more word of the target language corresponding to the concept symbol, the parts of speech and the case frames corresponding to the respective words of the target language;

a third memory to represent co-occurrence relation, including a word of the target language, a concept symbol, and a case thereof;

a thesaurus memory to represent implication among concepts;

a source language input device;

a target language output device; and a processor to translate a source language sentence into a target language sentence by utilizing the first, second, third and thesaurus memories.

In the apparatus of the invention, when a plurality of words of target language exist as candidates corresponding to the concept of a source language word and the intermediate representation shows that the concepts governs one or more argument concept, the third memory is utilized to check whether each candidate word has co-occurrence relation with one of the argument concepts or not. If there is any candidate word having a co-occurrence relation, it is selected. On the contrary, if there is no word having a co-occurrence relation, the thesaurus memory is utilized to check whether each candidate word has a co-occurrence relation with a general concept of the argument concept or not, and a suitable word of the target language is selected from the candidate words.

According to the invention, in a machine translation system, a suitable translation word can be selected corresponding to a word of the source language having a plurality of candidate equivalent words of the target language. Since the co-occurrence relation dictionary necessary therefor is not constituted by a relation between words but by a relation between a word and a (general) concept, the capacity of the dictionary can be made smaller. Also since one co-occurrence data represents plural co-occurrence relations in effect by utilizing the thesaurus, usefulness of the co-occurrence data becomes higher.

Further according to a preferred embodiment of the invention, at a utilization step of the natural language generating apparatus, knowledge regarding the co-occurrence relation based on feedback information from a revise operation to the translation results is obtained and stored in the third memory. Thereby data of co-occurrence relation can be made more and more complete.

Above mentioned and other features and objects of this invention will be apparent from the following detailed description taken in conjunction with the accompanying drawings.

BRIEF DESCRIPTION OF THE DRAWINGS

FIG. 3 is a diagram illustrating a record of an English generation dictionary storage device;

FIGS. 4 and 9 are diagrams illustrating a record of a co-occurrence relation dictionary;

DETAILED DESCRIPTION OF THE PREFERRED EMBODIMENTS

Figures 1, 2:
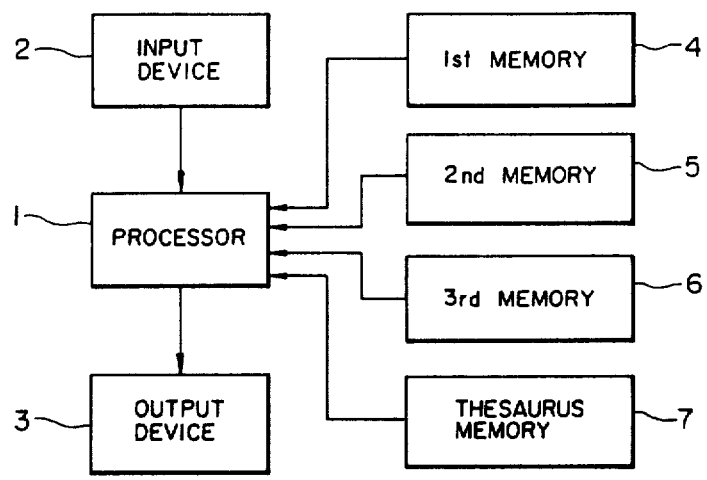
FIG. 1 is a block diagram of a natural language generating apparatus as an embodiment of the invention.
FIG. 2 is a diagram illustrating a record of a Japanese analysis dictionary storage device.

FIG. 1 is a diagram illustrating constitution of a natural language generating apparatus as an embodiment of the invention. This embodiment constitutes a Japanese-to-English machine translation apparatus where source language is Japanese and target language is English.

In FIG. 1, reference numeral 1 designates a processor to control the apparatus as a whole, numeral 2 designates an input device of Japanese as a source language, numeral 3 designates an output device which outputs a translated target language, numeral 4 designates a first memory being a Japanese analysis dictionary, numeral 5 designates a second memory being an English generation dictionary, numeral 6 designates a third memory being a co-occurrence relation dictionary, and numeral 7 designates a thesaurus memory.

The Japanese analysis dictionary in the first memory 4 is constituted by records as shown in FIG. 2. The record corresponds to a Japanese word and consists of the word 41, the part of speech 42, the case frame 43 and the concept symbol 44 representing the concept of the word. The case frame 43 is described as corresponding to a word representing a concept of predicate, such as verb or adjective. Regarding respective arguments (case elements) governed by the concept of predicate, the case frame 43 specifies the case codes representing semantic roles (agent, object, recipient or the like) and the surface case markers (post positions).

More specifically, for example, a case frame corresponding to a Japanese word " 割り当てる " as a concept of predicate includes cases, an agent, an object and a recipient, and surface case markers, "が" (GA), "を" (O) and "に" (NI).

A record in the Japanese analysis dictionary can be retrieved by using a word 41 or a concept symbol 44 as a key.

The English generation dictionary in the second memory 5 is constituted by records as shown in FIG. 3. The record corresponds to a concept symbol, and includes the concept symbol 51, one or more English words 52 representing the concept, the parts of speech 53 and the case frame 54 of each English word. The case frame 54 is described corresponding to a word representing a concept of predicate. Regarding respective arguments governed by the concept of predicate, the case frame 54 specifies the case codes and the surface case markers or syntactic roles in the English sentence. In case of nominal concept, the record includes only the concept symbol 51, the words 52 and the parts of speech.

The co-occurrence relation dictionary within the third memory 6 is constituted by records as shown in FIG. 4. The record is a triplet consisting of a predicate word 61 in English, an argument concept symbol 62 and a case code 63. It is seen from the record that the word 61 and a word representing the concept in the concept symbol 62 or a specific concept thereof may co-occur having the case relation designated by the case code 63.

The example record in FIG. 4 shows that a symbol representing a general concept for an object of "allocate" in English is "SHIGEN", which is a symbol to mean "resource" in English.

The co-occurrence relation dictionary can be retrieved by using the triplet of 61, 62 and 63 as the key. That is, the retrieval is effected regarding whether co-occurrence of the word 61, the concept 62 and the case 63 exists or not.

Figure 5:
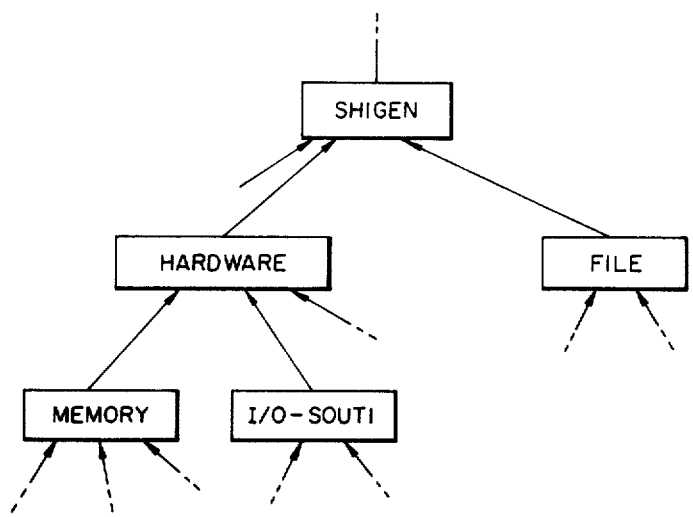
FIG. 5 is a diagram illustrating relation among concepts in thesaurus.

The thesaurus within the thesaurus memory 7 represents implication among concepts. When pointers are followed from an arbitrary concept, a general concept thereof can be retrieved. A concept symbol written at starting point side or a pointer is that of a specific concept, and a concept symbol written at ending point side of the pointer is that of a general concept. For instance, FIG. 5 shows that "SHIGEN" is a general concept of "HARDWARE", "MEMORY", etc.

Processing of Japanese-to-English translation using the machine translation apparatus in FIG. 1 will now be described referring to FIG. 6.

First, a Japanese sentence is read from the input device 2 (step 11), and the syntactic structure of the Japanese sentence and case relations are analyzed referring to the above-mentioned Japanese analysis dictionary. That is, according to pattern matching between predicate at the center and the case frame 43 thereof, intermediate representation as aggregation of dependence relations among concepts is obtained (step 12).

Next, referring to the English generation dictionary 5, the co-occurrence relation dictionary 6 and the thesaurus 7, a translation word in English corresponding to each concept in the intermediate representation is selected (step 13). And then an English sentence is generated referring to the English generation dictionary. That is, arrangement of translation words is determined based on the case frame 54 of the predicate (step 14). Finally, the obtained English sentence is outputted to the output device 3 (step 15).

Further, if the outputted English sentence is not correct, input for revise is read out from the input device 2 (step 16).

Further, if substitution of the translation word is contained in the revise, the co-occurrence relation dictionary is updated (step 17).

Figure 7:
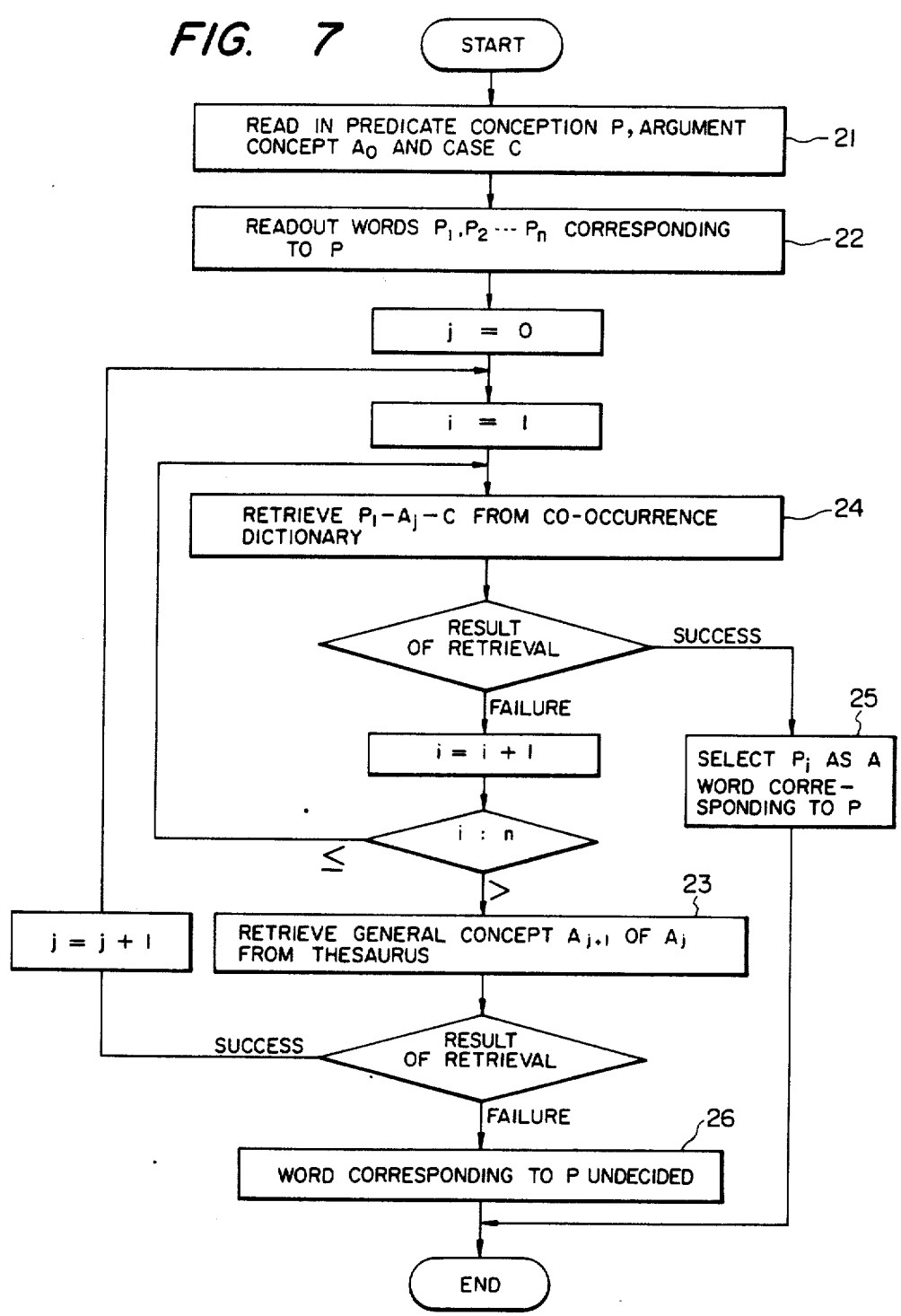
FIG. 7 is a flow chart illustrating detailed processing of step 13 in FIG. 6.

FIG. 7 shows the above-mentioned "selection of translation word" step 13 in detail, which is executed for each conceptual dependency constituting the intermediate representation. This will be described as follows:

First, from the intermediate representation obtained in step 12, three data, the predicate concept word P, the argument concept $A_o$ and the case C, are read (step 21). Next, candidates of English words $P_1, P_2, \ldots, P_n$ corresponding to the predicate concept P are read out from the English generation dictionary (step 22).

And then the general concepts $A_1, A_2, \ldots$ of the argument concept $A_o$ are retrieved from the thesaurus (step 23), and whether the co-occurrence of $P_i$ and $A_j$ in relation to the case C can exist or not is checked by consulting the co-occurrence relation dictionary 6 (step 24). If there is any co-occurring word $P_i$, this is selected as a translation word corresponding to the predicate concept P and the processing is finished (step 25).

If there is no co-occurrence relation to all general concepts of the argument concept $A_o$, a word corresponding to P is considered "undecided" and the processing is finished (step 26). In this case, the first candidate word $P_1$ is selected actually.

When a word corresponding to the concept of predicate is determined according to the above-mentioned processing, if the co-occurrence relation to the argument concept is not contained in the co-occurrence relation dictionary but the co-occurrence relation to the general concept of the argument concept is contained, this relation is utilized to select a suitable word. Let's consider an example sentence " 7ﾘｲﾙﾋ ｷﾘｰﾞｺｽ ". For example even if the triplet of a candidate word "allocate", a concept symbol "FILE" and a case code "OBJECT" is not contained in the co-occurrence relation dictionary, the word "allocate" is selected as the translation word utilizing existence of the triplet of "allocate", "SHIGEN" and "OBJECT" shown in FIG. 4.

When data of the co-occurrence relation stored in the third memory 6 is sufficient in the above-mentioned processing of translation, the above-mentioned processing is finished successfully in the above-mentioned step, but the co-occurrence relation data is unlikely to be stored sufficiently. It is preferable that data of the co-occurrence relation in the third memory are made more and more complete with utilization of the above-mentioned translation device.

Figure 6:
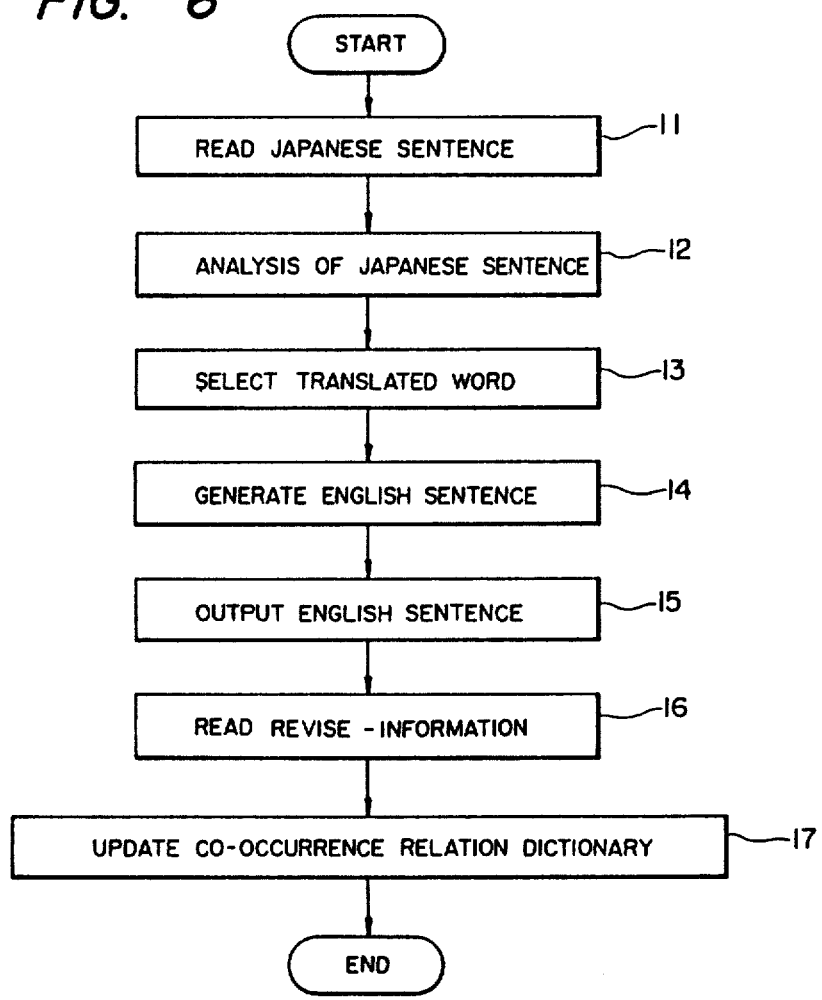
FIG. 6 is a diagram illustrating steps of a natural language generating method according to the invention.

Consequently, after step 15 of English sentence output of FIG. 6, if the English sentence outputted as above described is not correct, the revise information is read from the input device (step 16). Further, if substitution of the translation word is contained in the revise, content of the co-occurrence relation dictionary is updated by utilizing the revise information (step 17).

Unsuitable selection of translation word may be caused by (1) that necessary co-occurrence relation data are not registered in the co-occurrence relation dictionary, or (2) that illegal co-occurrence relation data are registered in the co-occurrence relation dictionary. Or, these may occur simultaneously.

When the revise is specified by substitution of words, information of which translation word is incorrect and which translation word is correct can be obtained directly from the input information for revise. Also when the revise is performed by substitution of characters, sentences before and after the revise are compared thereby information of which translation word is incorrect and which translation word is correct is extracted.

Assume that an unsuitable translation word $p_e$ is selected for the predicate concept P in the input sentence but the correct translation word is $p_c$. Referring to the intermediate representation the argument concepts of the predicate concept P can be identified. Assume that the argument concepts of the predicate concept P are $A_1, \ldots, A_N$.

Whether the unsuitable selection of the translation word is caused by above-mentioned (1) or (2) is determined as follows. If $p_c$ is not the first candidate translation word of P, the cause is (1); if at least one of predicate-argument pairs $p_e$ and $A_1, \ldots, p_e$ and $A_N$ exists in the co-occurrence relation dictionary, the cause is (2).

As a result of the judgement, if the cause is (1), the predicate-argument pairs $p_c$ and $A_1, \ldots, p_c$ and $A_N$ is registered in the co-occurrence relation dictionary. If the cause is (2), the predicate-argument pairs $p_e$ and $A_1$, ..., $p_e$ and $A_N$ are deleted from the co-occurrence relation dictionary.

Figure 8:
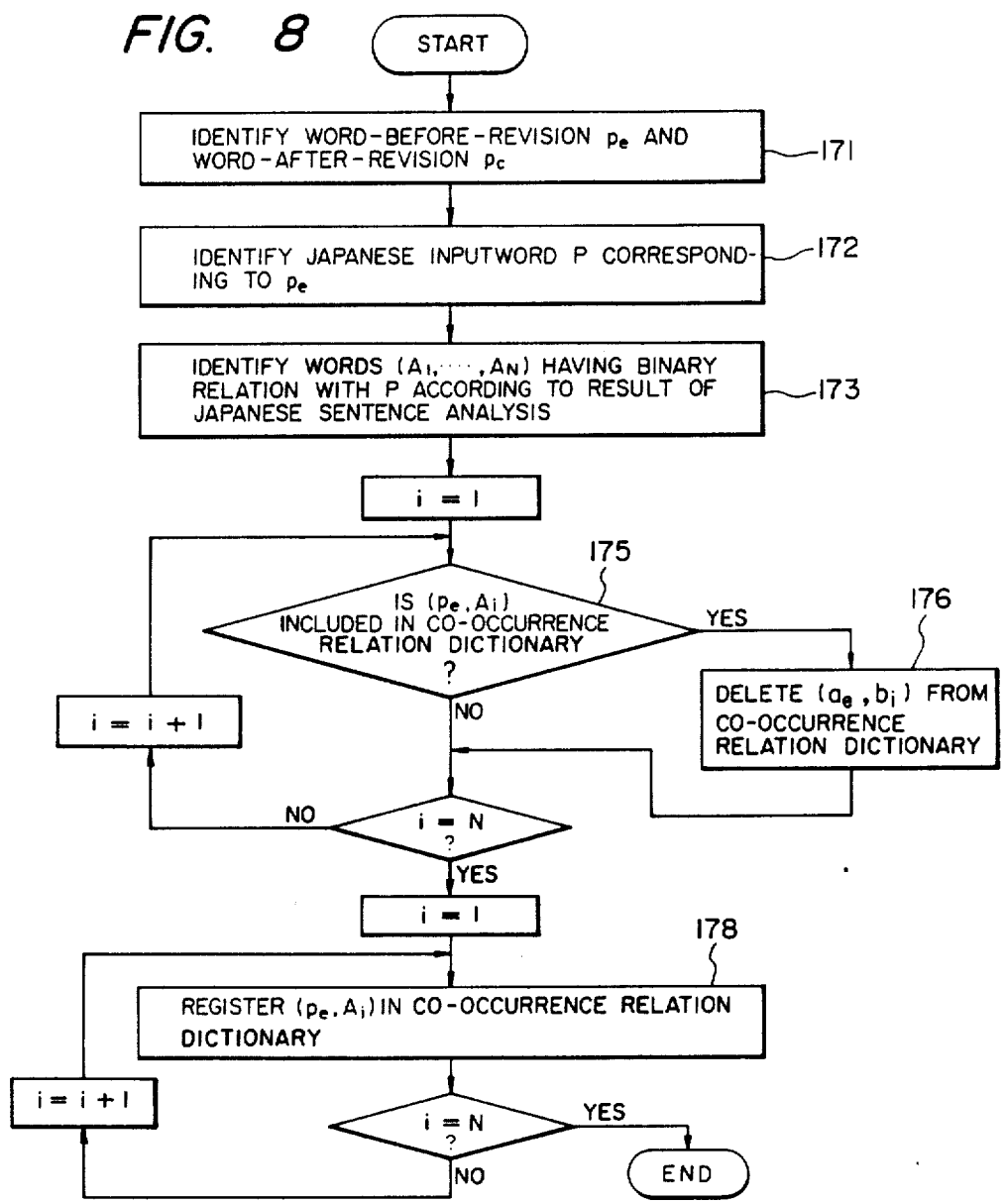
FIG. 8 is a flow chart illustrating detailed processing of step 17 in FIG. 6.

FIG. 8 shows processing flow of the co-occurrence relation dictionary update step.

As shown in FIG. 8, it is identified that a word $p_e$ in the outputted English sentence is substituted by $p_c$ and revised (step 171). And then, by referring to results of the translation word selection step 13, it is judged which concept P corresponds to the translation word $p_e$ (step 172).

Next, by referring to the result of the Japanese sentence analysis step 12 (intermediate representation), the argument concepts $A_1, \ldots, A_N$ of the predicate concept P is identified (step 173).

And then, it is examined whether each predicate-argument pair $p_e$ and $A_i$ ($i=1, \ldots, N$) is contained in the co-occurrence relation dictionary or not (step 175). As a result, if it is contained, since this is judged as cause of the unsuitable translation word selection for P, the predicate-argument pair $p_e$ and $A_i$ is deleted from the co-occurrence relation dictionary (step 176).

Finally, since it is also judged as cause of the unsuitable translation word selection for P that the predicate argument pairs $p_c$ and $A_i$ are not contained in the co-occurrence relation dictionary, the predicate-argument pairs of $p_c$ and $A_i$ ($i=1, \ldots, N$) are registered in the co-occurrence relation dictionary (step 178).

Figure 9:
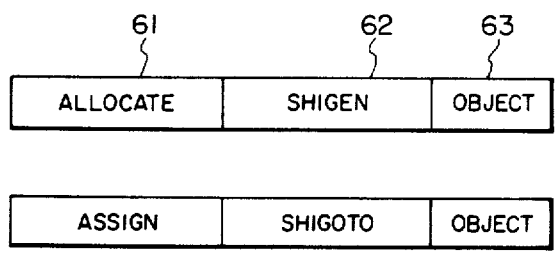

For example, when an English generation dictionary as shown in FIG. 3 and a co-occurrence relations dictionary as shown in FIG. 9 are used, translation result "allot a file" of input Japanese sentence " 7ﾘｲﾙﾋ ｷﾘｰﾞｺｽ " is obtained. Assume that corresponding to this, revise of substituting "allot" by "allocate" is effected.

With respect to the co-occurrence relation dictionary update in this case, since the predicate-argument pair "allot" and "FILE" is not contained in the co-occurrence relation dictionary, there is no data to be deleted. And the predicate-argument pair "allocate" and "FILE" is newly registered in the co-occurrence relation dictionary.

As another example, assume that corresponding to translation result "assign a task" of input Japanese sentence " ｼｺﾞｷ ｷﾘｰﾞｺｽ ", revise of substituting assign" by "allot" is effected. With respect to the co-occurrence relation dictionary update in this case, since the predicate-argument pair "assign" and "SHIGOTO" is contained in the co-occurrence relation dictionary, "assign" was selected. However, since it is judged that the selection is not suitable, the predicate-argument pair "assign" and "SHIGOTO" is deleted from the co-occurrence relation dictionary. And the predicate-argument pair "allot" and "SHIGOTO" is registered in the co-occurrence relation dictionary.

In this embodiment, no restriction is put on the kind of cases between predicate-argument pairs to be registered in the co-occurrence relation dictionary. However, since some particular cases have close relation with the selection of translation words, limitation on case relation is also effective. Because limitation on case relation prevents registration of useless predicate-argument pairs which may cause unsuitable word selection, and realizes the co-occurrence relation dictionary of small capacity and improves accuracy of the translation word selection.

Furthermore, statistical weighting of the co-occurrence relation data may prevent repetition of registration and deletion of specific data. That is, when the co-occurrence relation data causes suitable selection of translation words, the weight of the relation is increased, and when the co-occurrence relation data causes unsuitable selection of translation words, the weight of the relation is decreased and the relation is deleted from the co-occurrence relation dictionary just in case the weight becomes negative, thereby repetition of the registration and the deletion can be prevented.

We claim:

1. A natural language generating system, which translates a source language text into a target language, said system comprises:

a word dictionary memory storing a predicate concept represented by a source language word and at least one target language word corresponding thereto;

a co-occurrence relation dictionary memory storing co-occurrence relation between a target language word and the predicate concept;

a thesaurus memory representing implication among predicate concepts represented by source language words; and, a processing device referring to the co-occurrence relation dictionary memory and the thesaurus memory when a plurality of target language words exist corresponding to a predicate concept represented by a source language word to be translated in the word dictionary memory, and selecting a target language word having co-occurrence relation with an argument concept corresponding to the predicate concept represented by the source language word to be translated or with the general concept thereof.

2. A natural language generating system according to claim 1, wherein said word dictionary memory comprises:

a source language analysis dictionary constituted by records, each including a word of a source language, a part of speech of the word, and a concept symbol representative of the concept of the word, and further including a case frame when the word is one representing a predicate concept;

said case frame including case codes representing semantic roles of arguments governed by the predicate concept, and surface case markers;

a target language generation dictionary constituted by records, each including a concept symbol, one or more words of the target language corresponding to the concept symbol, and parts of speech of the respective words, and further including a case frame when the word is one representing a predicate concept; and, wherein said processing device comprises means for analyzing the syntactic and semantic structure of the source language sentence by referring to words of source language, parts of speech, and case frames in source language dictionary records; mapping source language words onto concept symbols by referring to source language words and concept symbols in source language dictionary records; mapping concept symbols and target language words in target language dictionary records; and generating a target language sentence by referring to target language words, parts of speech and case frames in target language dictionary records.

3. A natural language generating system according to claim 2, wherein said co-occurrence relation dictionary is constituted by co-occurrence data including a target word, a concept symbol and a case code; and, said processing device refers to the co-occurrence relation dictionary to examine the existence of a triplet of a predicate word of target language, and argument concept and case code.

4. A natural language generating method which translates a source language text into a target language, said method comprises:

a first step of reading a source language sentence inputted from an input device, referring to a source language analysis dictionary stored in a memory, analyzing the syntactic and semantic structure of the source language sentence and case relations, and obtaining intermediate representation comprising dependence relations among concepts;

a second step of referring to a target language generation dictionary, a co-occurrence relation dictionary and a thesaurus memory, and determining at least one target language word corresponding to each concept in the intermediate representation; and a third step of referring to the target language generation dictionary, determining an arrangement of the target words determined at said second step based on case frames of predicate words, and outputting a translation result to an output device.

5. A natural language generating method according to claim 4, wherein said second step comprises:

a first retrieval step of retrieving co-occurrence data comprising of a candidate word corresponding to the predicate concept, an argument concept thereof and the case of the argument concept from the co-occurrence relation dictionary, when a plurality of candidate words of the target language exist corresponding to a predicate concept in the intermediate representation; and a second retrieval step of retrieving a general concept of the argument concept from the thesaurus when retrieval fails at said first retrieval step, and retrieving co-occurrence data of the predicate concept and the general concept of the argument concept from the co-occurrence relation dictionary.

6. A natural language generating method according to claim 4, which further comprises:

a fourth step of deleting a co-occurrence relation between an old word and the concept from the co-occurrence relation dictionary and adding a co-occurrence relation between a new word and the concept to the co-occurrence relation dictionary, when the target language word for a concept is replaced with another word in post-editing.

7. A natural language generating system for translating a source language into a target language comprising:

means for inputting the source language into the system;

means for outputting the target language out of the system;

processing means for translating a source language text into a target language comprising first memory means for storing a source language analysis dictionary including relational data of a source word, a part of speech, a case frame and an associated concept; a second memory means for storing a target language generation dictionary similarly including relational data of a target word, a part of speech, a case frame and an associated concept; a third memory means for storing a co-occurrence relationship comprising a predicate word of target language, an argument concept, and a case thereof; and a thesaurus memory for storing a relationship of a concept and a general concept thereof, said processing means being in communication with the memories for selected access thereto whereby a target language sentence is generated by identifying the part of speech, the concept and the case frame associated with a source word from the first memory means, identifying the predicate-argument structure of a source language sentence on the basis of the case frames of source words representing a predicate concept and parts of speech source words, identifying a plurality of candidates of target words, for a predicate concept, and the part of speech and the case frame associated with a target word from the second memory means, identifying general concepts of an argument concept from the thesaurus memory; selecting a candidate word is a triplet comprising the candidate word, an argument concept or a general concept of an argument concept, and the case of the argument is retrieved from the third memory means; and determining the syntactic structure of a target language sentence on the basis of the case frames of target words representing a predicate concept and the parts of speech of target words.

* * * * *